(12) United States Patent
Lee et al.

(10) Patent No.: US 7,548,838 B2
(45) Date of Patent: Jun. 16, 2009

(54) METHOD FOR DESIGNING DEVELOPMENT DRAWING OF DEVELOPABLE SURFACE

(75) Inventors: Joo Haeng Lee, Taejon (KR); Hyun Kim, Taejon (KR); Hyoung Sun Kim, Taejon (KR); Jin Mi Jung, Choongchungbuk-Do (KR)

(73) Assignee: Electronics and Telecommunications Research Institute, Taejon (KR)

( * ) Notice: Subject to any disclaimer, the term of this patent is extended or adjusted under 35 U.S.C. 154(b) by 429 days.

(21) Appl. No.: 10/867,783

(22) Filed: Jun. 16, 2004

(65) Prior Publication Data

US 2005/0143964 A1 Jun. 30, 2005

(30) Foreign Application Priority Data

Dec. 24, 2003 (KR) .................. 10-2003-0096971

(51) Int. Cl.
*G06F 17/10* (2006.01)
(52) U.S. Cl. ............................................. 703/2
(58) Field of Classification Search .................. 703/2
See application file for complete search history.

(56) References Cited

FOREIGN PATENT DOCUMENTS

KR 2001-68351 7/2001

OTHER PUBLICATIONS

Lee et al.; Generalized Cylinder based on Linear Interpolation by Direction Map; International Journal of CAD/CAM vol. 3, No. 2, pp. 77-83 (2003).*

Joo-Haeng Lee, et al.; *"Efficient Computation and Control of Geometric Shape Morphing based on Direction Map"*; Korean CAD/CAM Institute; 2003.

* cited by examiner

*Primary Examiner*—Hugh Jones
(74) *Attorney, Agent, or Firm*—Lowe Hauptman Ham & Berner, LLP

(57) ABSTRACT

Disclosed is a method for designing a development drawing of a developable surface, the method including the steps of: setting a control contour from a circumference surface of a 3-dimensional model; performing an algorithm LIDM-GC-Dvlp to search a control point set; outputting a control point of a profile curve; visualizing a developable surface typed general circumference surface; modifying a design by a user depending on the visualized result; selecting a developable surface segment intended to generate the development drawing; and performing an algorithm LIDM-GC-Plane-Dvlp for the control point to generate the development drawing.

6 Claims, 16 Drawing Sheets
(12 of 16 Drawing Sheet(s) Filed in Color)

Algorithm 4 (LIDM-GC Plane Development)

Input (1) Output of Algorithm 3: P; and
(2) Number of samples for curve length approximation: $n$.
Output A set of polygons representing planar boundary curves of developable surface patches: $C^P = \{C_0^P, ..., C_l^P\}$ where $C_i^P$ is composed of a list of planar vertices $\{v_{i,j}\}$.
Procudure LIDM-GC-Plane-Dvlp(P, $n$; $C^P$)

1. for $i \leftarrow 1$ to $l$; /* for each direction vector as the ruling of a developable surface patch */
2.    for $j \leftarrow 0$ to $m$;
3.       $d_i \leftarrow p_{(i+1)\%l,j} - p_{i,j}$;
4.       if $|d_i| \neq 0$ then break;
5.    for $j \leftarrow 0$ to $m$;
6.       $h_{i,j}^L \leftarrow \frac{((p_{i,j} - p_{i,0}) \cdot d_i)}{(d_i \cdot d_i)}$; /* $h_i^L = \{h_{i,0}^L, ..., h_{i,m}^L\}$ */
7.       $p_{i,j}^d \leftarrow p_{i,j} - h_{i,j}^L \cdot d_i$; /* $P_i^d = \{p_{i,0}^d, ..., p_{i,m}^d\}$ */
8.       $h_{i,j}^U \leftarrow \frac{((p_{(i+1),j} - p_{i,j}^d) \cdot d_i)}{(d_i \cdot d_i)}$; /* $h_i^U = \{h_{i,0}^U, ..., h_{i,m}^U\}$ */
9.    for $j \leftarrow 0$ to $n$; /* get the vertices of $C_i^P = \{v_{i,j}\}$ */
10.       $t \leftarrow \Delta t * j$; /* $\Delta t = 1/n$ */
11.       $x \leftarrow$ CurveLengthBezierCurve3D($t, P_i^d$);
12.       $y^L \leftarrow |d_i| \cdot$ BezierCurve1D($t, h_i^L$); /* one dimensional B */
13.       $v_{i,j} \leftarrow (x, y^L)$; /* the vertex in the lower boundary of $C_i^P$ */
14.       $y^U \leftarrow |d_i| \cdot$ BezierCurve1D($t, h_i^U$);
15.       $v_{i,(2n+1-j)} \leftarrow (x, y^U)$; /* the vertex in the upper boundary of $C_i^P$ */

FIG. 3

PDF Version

Algorithm 3 (LIDM-GC Developable Surface)

Input: Two terminal contours and additional control contours: $C = \{C_0, ..., C_m\}$;
Output: Sets of control points defining boundary curves of developable surface patches: $P = \{P_1, ..., P_l\}$ where $P_i = \{P_{i,0}, ..., P_{i,m}\}$ and $p_i$ defines a boundary curve $F_i$.
Procudure LIDM-GC-Dvlp(C; P)

1.    $D \leftarrow D_0 \uplus \cdots \uplus D_m$    /* merge directions maps: $D_i = DM(A_i)$ */
2.    $L \leftarrow |D|$;    /* the number of direction vectors in $D$ */
3.    for $i = 1$ to $l$    /* for each profile curve $F_i$ defined by a direction vector $d_i$ */
4.      $d_i \leftarrow$ the $i$-th direction vector of $D$;
5.      $P_i \leftarrow \emptyset$;
6.      for $j = 0$ to $m$    /* find each set of control points $P_i$ defining $F_i$ */
7.        $d \leftarrow$ find a direction vector of $D$ that satisfies following two conditions:
         (1) the counter-clockwise nearest direction vector from $d_i$ in $D$ (including $d_i$); and
         (2) its group id is $j$;    /* selecting a single vertex from $C_j$ */
8.        $p_{i,j} \leftarrow$ the vertex of $C_j$ corresponding to the end point of $d$;
9.      $P_i \leftarrow P_i \cup \{p_{i,j}\}$;
10.    $P \leftarrow P \cup P_i$;

FIG. 6

Algorithm 4 (LIDM-GC Plane Development)

Input (1) Output of Algorithm 3: P; and
(2) Number of samples for curve length approximation: $n$.
Output A set of polygons representing planar boundary curves of developable surface patches: $C^p = \{C_0^p, ..., C_l^p\}$ where $C_i^p$ is composed of a list of planar vertices $\{v_{i,j}\}$.
Procedure LIDM-GC-Plane-Dvlp(P, $n$; $C^p$)

1. for $i \leftarrow 1$ to $l$;  /* for each direction vector as the ruling of a developable surface patch */
2.   for $j \leftarrow 0$ to $m$;
3.     $d_i \leftarrow p_{(i+1)\%l,j} - p_{i,j}$;
4.     if $|d_i| \neq 0$ then break;
5.   for $j \leftarrow 0$ to $m$;
6.     $h_{i,j}^L \leftarrow \frac{\langle (p_{i,j} - p_{i,0}) \cdot d_i \rangle}{\langle d_i, d_i \rangle}$;  /* $h_i^L = \{h_{i,0}^L, ..., h_{i,m}^L\}$ */
7.     $p_{i,j}^d \leftarrow p_{i,j} - h_{i,j}^L \cdot d_i$;  /* $P_i^d = \{p_{i,0}^d, ..., p_{i,m}^d\}$ */
8.     $h_{i,j}^U \leftarrow \frac{\langle (p_{(i+1),j} - p_{i,j}^d) \cdot d_i \rangle}{\langle d_i, d_i \rangle}$;  /* $h_i^U = \{h_{i,0}^U, ..., h_{i,m}^U\}$ */
9.   for $j \leftarrow 0$ to $n$;  /* get the vertices of $C_i^p = \{v_{i,j}\}$ */
10.     $t \leftarrow \Delta t * j$;  /* $\Delta t = 1/n$ */
11.     $x \leftarrow$ CurveLengthBezierCurve3D($t$, $P_i^d$);
12.     $y^L \leftarrow |d_i| \cdot$ BezierCurve1D($t$, $h_i^L$);  /* one dimensional B */
13.     $v_{i,j} \leftarrow (x, y^L)$;  /* the vertex in the lower boundary of $C_i^p$ */
14.     $y^U \leftarrow |d_i| \cdot$ BezierCurve1D($t$, $h_i^U$);
15.     $v_{i,(2n+1-j)} \leftarrow (x, y^U)$;  /* the vertex in the upper boundary of $C_i^p$ */

METHOD FOR DESIGNING DEVELOPMENT DRAWING OF DEVELOPABLE SURFACE

BACKGROUND OF THE INVENTION

1. Field of the Invention

The present invention relates to a method for designing a developable surface and a development drawing applied to a computer, and more particularly, to a method in which a developable surface is designed to be a general circumferential surface using a direction map, and a property of the direction map is used to generate a corresponding development drawing on a plane.

2. Description of the Related Art

A way for drawing a development drawing of an object that can be approximate to a plane such as a thin iron plate (sheet metal), a paper and the like, cutting the object for assembly, and then making a curved-surface shaped cubic figure is generally mainly used in shipbuilding and car industries and the like. A curved-surface that can make the development drawing in the above way is called a developable surface in mathematics. Since a complex mathematical calculation is required to design the developable surface and generate the development drawing thereof, a CAD (Computer Aided Design) system using a computer is used.

In a design of the curved-surface shaped cubic figure, a direction map based general circumference surface is a curved-surface modeling method that is essential for geometric modeling since a contour shape can be controlled to facilitate a control of an entire curved-surface shape and further a simple calculation can be performed. However, a method for designing the general circumference surface to be the developable surface is not known.

SUMMARY OF THE INVENTION

Accordingly, the present invention is directed to a method for designing a development drawing of a developable surface and, which substantially obviates one or more problems due to limitations and disadvantages of the related art.

It is an object of the present invention to provide a method for designing a development drawing of a developable surface in which a conventional method is improved in designing a direction map based general circumference surface such that an entire surface can be effectively generated using a definition of a sequential factoring curve without generating a finite number of middle contours, in which a special condition is provided for allowing the general circumference surface designed by the above method to be the developable surface by a property of the direction map, and in which a development drawing of the direction map based general circumference surface for satisfying the above condition is generated in a 2-dimension.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for designing a development drawing of a developable surface, the method including the steps of: setting a control contour from a circumference surface of a 3-dimensional model; performing an algorithm LIDM-GC-Dvlp to search a control point set; outputting a control point of a profile curve; visualizing a developable surface typed general circumference surface; modifying a design by a user depending on the visualized result; selecting a developable surface segment intended to generate the development drawing; and performing an algorithm LIDM-GC-Plane-Dvlp for the control point to generate the development drawing.

It is to be understood that both the foregoing general description and the following detailed description of the present invention are exemplary and explanatory and are intended to provide further explanation of the invention as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are included to provide a further understanding of the invention, are incorporated in and constitute a part of this application, illustrate embodiments of the invention and together with the description serve to explain the principle of the invention. In the drawings:

FIG. 3 is an algorithm for calculating a control point of a boundary of a developable surface according to the present invention;

FIG. 6 is an algorithm for developing a developable surface on a plane; and

DETAILED DESCRIPTION OF THE INVENTION

Reference will now be made in detail to the preferred embodiments of the present invention, examples of which are illustrated in the accompanying drawings.

Figure 1:
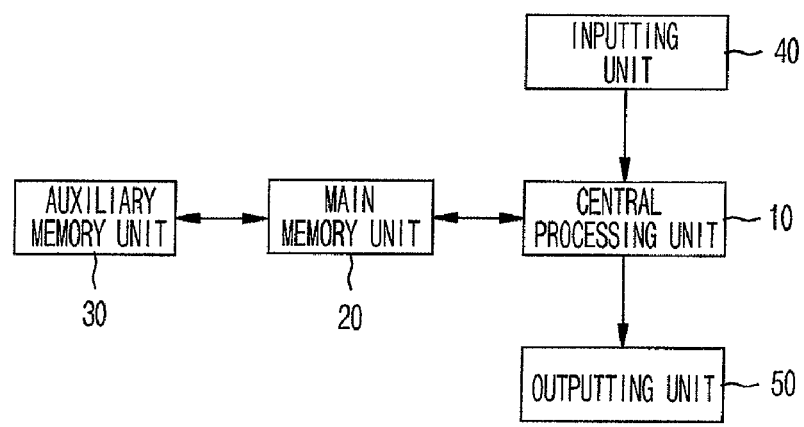
FIG. 1 is a view illustrating a general computer system for embodying the present invention.

FIG. 1 is a view illustrating a general computer system for embodying a method for designing a development drawing of a developable surface according to the present invention.

Referring to the drawing, the computer system includes: a central processing unit 10 for controlling an entire computer system; a main memory unit 20 for storing all data necessary for development execution therein; an auxiliary memory unit 30 for temporarily storing therein and outputting work data therefrom depending on a control of the central processing unit 10; an inputting unit 40 for commanding a motion to the central processing unit 10 depending on worker's manipulation; and an outputting unit 50 for displaying a work state.

The design method of the development drawing that the present invention intends to disclose is programmed to be stored in a recording media in a computer-readable format. The program stored in the recording media is managed on the computer such that the development drawing of a developable 3-dimensional virtual surface inputted through the inputting unit 40 can be outputted on a 2-dimensional plane, and an initially inputted developable surface can reappear in a 3-dimensional model by combining the outputted development drawing.

Figure 2:
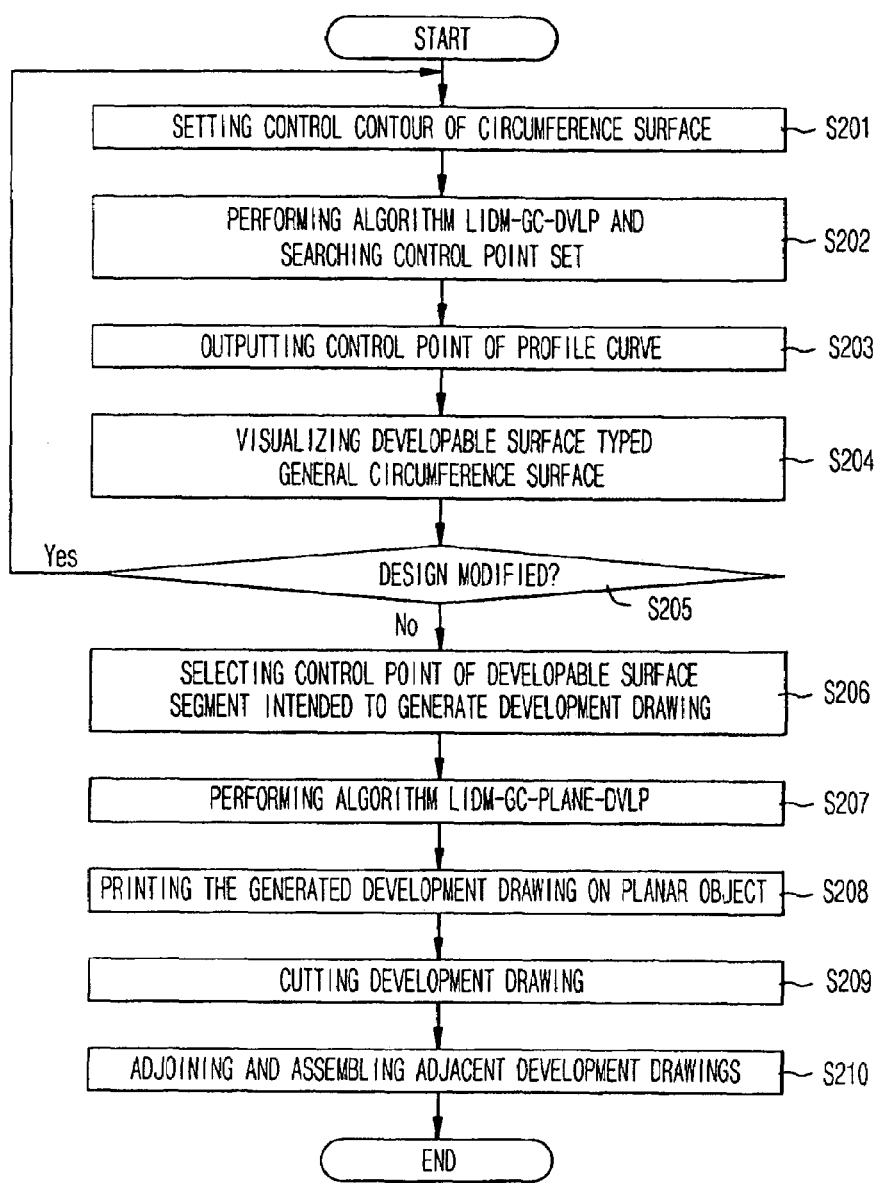
FIG. 2 is a flow chart illustrating a method for designing a development drawing of a developable surface according to the present invention.

FIG. 2 is a flow chart illustrating the method for designing the development drawing of the developable surface according to the present invention.

Referring to the drawing, the design method for designing the development drawing of the developable surface according to the present invention including the steps of: setting a control contour from a 3-dimensional model (S201); performing an algorithm LIDM-GC-Dvlp (S202); outputting a control point of a profile curve (203); visualizing a developable surface typed general circumference surface (S204); modifying a design by a user depending on the visualized result (S205); selecting a developable surface segment intended to generate the development drawing (S206); performing an algorithm LIDM-GC-Plane-Dvlp for the control point to generate the development drawing (S207); and printing or engraving the generated development drawing on a plane material (S208).

Accordingly, the present invention performs a routine of the above steps such that the development drawing of a developable 2-dimensional or 3-dimensional surface is designed on a 2-dimensional plane, and performs steps of 209 and 210 to cut the designed development drawing and to adjoin adjacent development drawings such that the 3-dimensional model is assembled.

Hereinafter, in order to be helpful for understanding in programming to enable the design method of the development drawing of the developable surface to be executed in the computer, simple mathematical definitions are arranged.

In the present invention, a general circumference is comprised of at least two 2-dimensional contours and a curve on 2-dimension or 3-dimension at which the contours are disposed. At this time, this curve is called a spine curve of the general circumference.

The general circumference can be specifically exemplified as a right cylinder. In the right cylinder, the contour is a combination circle constituting a bottom surface and a top surface of the cylinder, and the spine curve is a line segment right-angled to a contour circle.

The spine curve and the boundary of the contour are expressed as a 2-dimensional or more curve, or a point set being representative of the curve. In case that they are expressed using the point set, the contour boundary can be viewed as a polygon, and the spine curve can be viewed as a polyline.

In the present invention, the contour defining the general circumference is the polygon. It is assumed that the polygon is expressed by at least three vertices, and the boundary connecting them is always clockwise.

A direction map of the polygon is a circular arrangement of vectors defined using two adjacent vertices. At t this time, these vectors are called direction vectors. For example, two adjacent vertices $(P_i, P_{i+1})$ define one direction vector $d_i = P_{i+1} - p_i$.

If two direction maps are merged, a new direction map can be obtained. If the direction vector of the new direction map is orderly connected, a new figure can be obtained. The new figure is different depending on how the direction map is merged. A merge of the direction map is to rearrange an order of the direction vectors according to an appropriate rule. The merge of the direction vector is exemplified as a convolution merge or a merge of a minimum convex hull.

The below described present invention is not limited to a specific merge method. It is called a group unit based size control operation that the direction vector of the merged direction map is divided into a group to adjust its length.

A new middle figure can be made for interpolating given polygons through the merge and the group unit based size control operation. A conventional patent using the above fact has ever provided a method for generating a finite number of middle figures as the contour and generating a polygon mesh connecting the contours to perform an approximation of the general circumference surface.

This method has a simple calculation way, but has a disadvantage in which a middle contour should be generated. That is, if a precision degree of the general circumference surface becomes different, the middle contour should be again calculated. Further, since the surface generated in a type of a polygon mesh is stored, it can be regarded to have a large amount of data.

A ruled surface is defined by a straight line moving along the curve. At this time, the curve is called a directrix and the straight line is called a ruling.

The developable surface is a particular type of the ruled surface. Specifically, there is a property that all points existing at a specific ruling of the developable surface has the same tangent plane.

Due to this, the developable surface can be spread on the plane without stretching or tearing. This property is usefully used in a manufacture way using material of a sheet metal type. For example, it is very appropriate in designing streamlined traffic means and the like for minimizing fluid resistance.

When the contours of the general circumference surface all have the same orientation, all corresponding line segments of the mixed contours are parallel to one another. This is because corresponding line segments are defined using the same direction vector. Accordingly, each direction vector moving along a specific directrix is defined as $d_i$, and a circumference typed developable surface segment is defined as $S_i$.

The present invention provides the design method of the development drawing of the circumference typed developable surface. A conic typed developable surface is not described since it is merely a basic technique of the present invention.

In order to enable the inventive design method, the contours defining the general circumference surface should be all put on a parallel plane as in the step 201. This is a condition for fixing the direction vector along the spine curve to design the conic typed developable surface.

Each developable surface segment $S_i$ is defined as two boundary curves. These are respectively defined as $F_{i-1}(u)$ and $F_i(u)$, and are called profile curves (Referring to FIG. 5A).

Each of the profile curves corresponds to the path on which one vertex of one contour moves. By the property of the merge direction map and the group unit based size control operation, each of the vertices of the mixed contours is defined as a mixture of the vertices of a control contour. At this time, the mixture ratio follows a size control factor specified in the group unit based size control operation.

If Bernstein polynomial $B_j^m(u)$ is used as the size control factor, the profile curve $F_i(u)$ is expressed as Bezier curve such as the following Equation 1.

$$F_i(u) = \sum_{j=0}^{m} B_j^m(u) \cdot p_{i,j} \qquad \text{[Equation 1]}$$

If the size control factor is used as another basis function, a property of the profile curve is also differentiated. For example, it can be NURBS or blossom curve typed.

An adjacent profile curve satisfies the property such as the following Equation 2.

$$\langle F_i(u) - F_{i-1}(u), d_i \rangle = 0.$$

$$\langle P_{i,j} - P_{i-1,j}, d_i \rangle = 0. \qquad \text{[Equation 2]}$$

Accordingly, corresponding control points $P_{i-1,j}$ and $P_{i,j}$ of the profile curves $F_{i-1}(u)$ and $F_i(u)$ of the developable surface segment $S_i$ defined by the direction vector $d_i$ have one relation of the followings.

(1) the corresponding control point is consistent ($P_{i-1,j} = P_{i,j}$), or otherwise (2) the corresponding control point is put on the plane parallel with the corresponding direction vector $d_i(P_{i-1,j} - P_{i,j})//d_i$.

Based on this rule, the algorithm of FIG. 3 is operated for enabling the step 202. This algorithm is called "LIDM-GC-Dvlp". The algorithm disclosed in FIG. 3 searches a control point set for defining the developable surface.

The control point searched using the algorithm LIDM-GC-Dvlp disclosed in FIG. 3 can be used to express the developable surface segment $S_i$ using a factoring equation such as the following Equation 3. In the below example, a Bernstein polynomial is used as the size control factor.

$$\begin{aligned}S_i(u,v) &= (1-v)F_{i-1}(u) + vF_i(u) \qquad \text{[Equation 3]}\\ &= (1-v)\sum_{j=0}^{m} B_j^m(u) \cdot p_{i-1,j} + \\ &\quad v\sum_{j=0}^{m} B_j^m(u) \cdot p_{i,j} \\ &= \sum_{j=0}^{m} \sum_{k=0}^{1} B_j^m(u) B_k^1(u) \cdot p_{i-1+k,j} \end{aligned}$$

According to the Equation 3, it can be understood that the generated developable surface segment is a (m,1) order of Bezier surface.

FIG. 4 in detail illustrates the steps 202 to 204 of FIG. 2.

Referring to the drawing, the present invention shows a procedure of searching the control point of the developable surface segment using the algorithm LIDM-GC-Dvlp, and inserting the searched control point into the factoring equation to represent an entire developable surface.

Figure 4A:
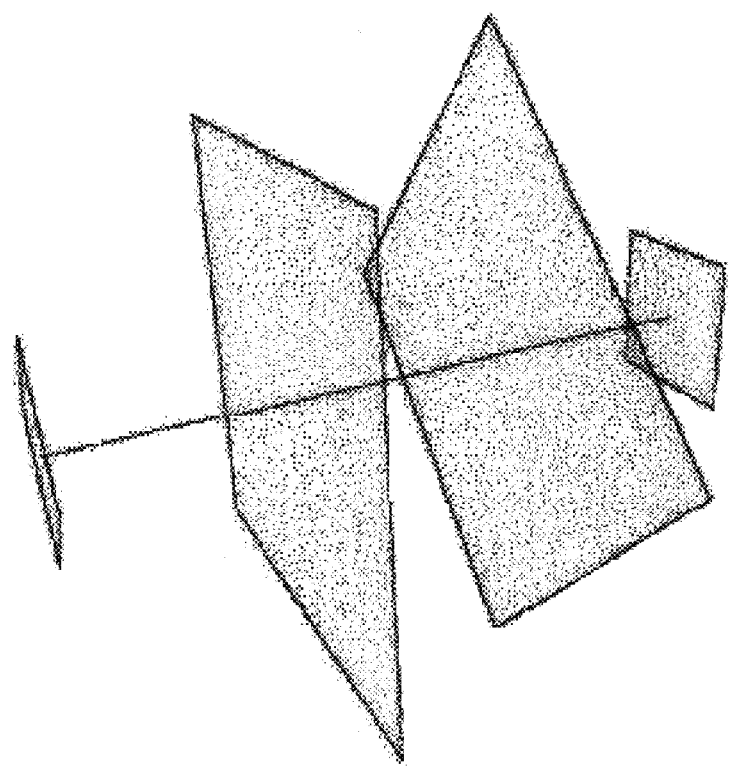
FIGS. 4a-4f are views of an embodiment using algorithm of FIG. 3.

FIG. 4A illustrates four control contours provided for defining the general circumference. Made is the surface connecting small rectangles having different orientations from one another at both ends. At this time, a large rectangular control contour disposed at a middle portion additionally controls a shape of the surface.

Figure 4B:
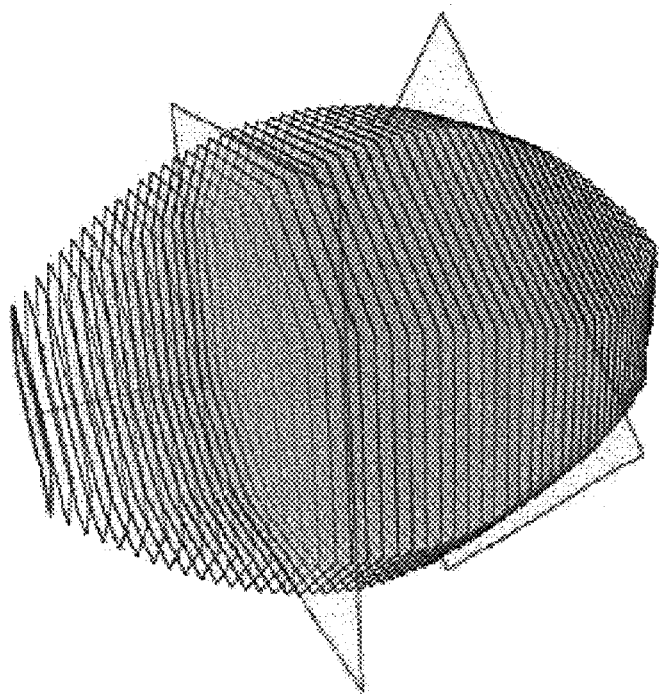

FIG. 4B illustrates a middle contour generated using the control contours of FIG. 4A so as to generate the polygonal mesh in a conventional method of generating the direction map based general circumference.

Figure 4C:
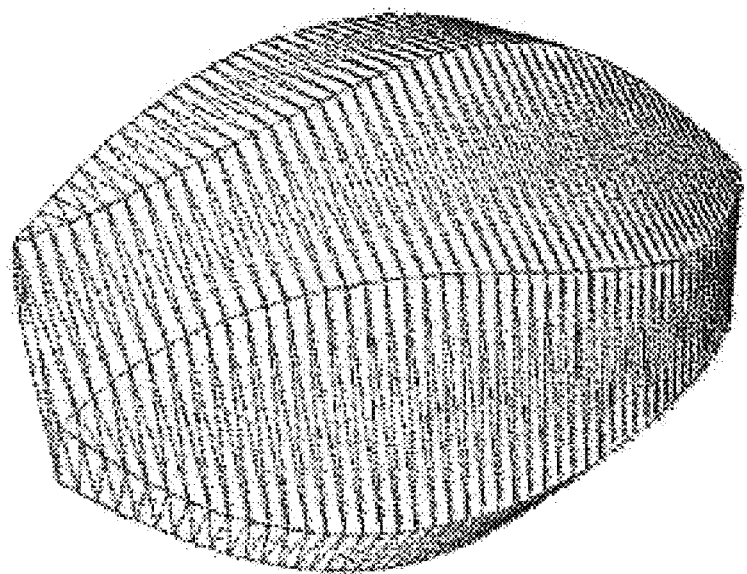

FIG. 4C illustrates the mesh for connecting the middle contour according to the conventional method of generating the direction map based general circumference. Particularly, the bottom surface (sky blue) portion corresponds to a locus on which any one direction vector moves while the length is changed.

Figure 4D:
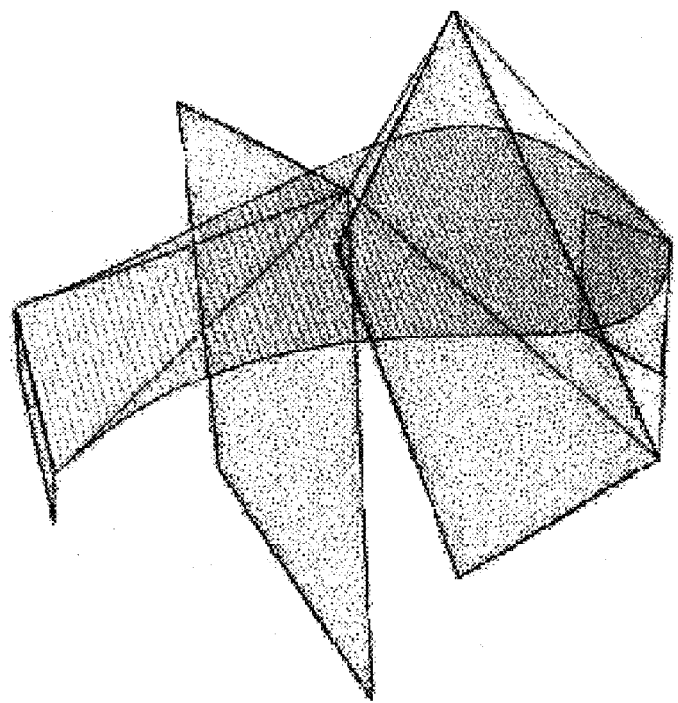

FIG. 4D shows a result of searching the control point defining the surface segment of FIG. 4C among the vertices of the control contour, by using the algorithm LIDM-GC-Dvlp.

Figure 4E:
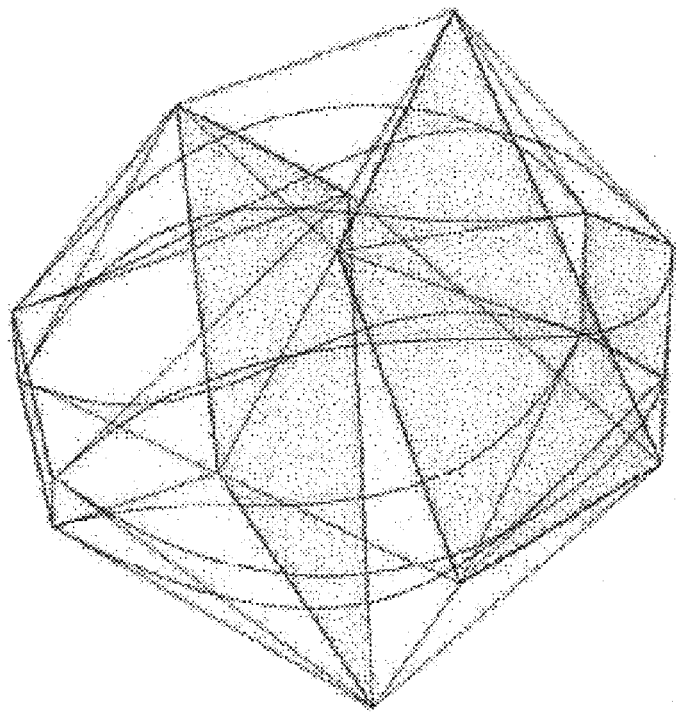

FIG. 4E shows the profile curves defined by the entire control point searched by using the method as in FIG. 4D.

Figure 4F:
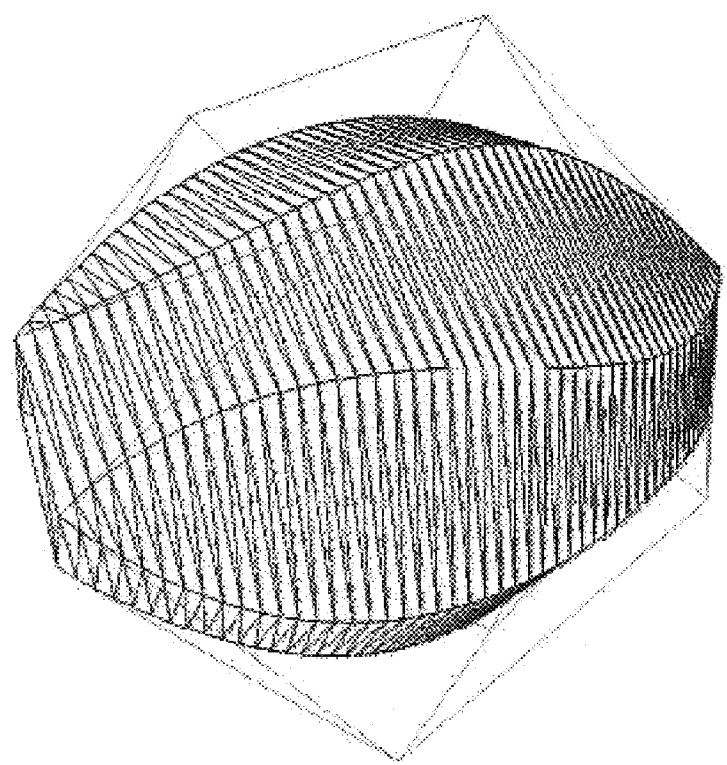

FIG. 4F illustrates the searched control point expressed in the factoring surface type as in the Equation.

The development drawing of the above-generated developable surface can be easily drawn on the plane. The step 206 is described in the following.

The present invention defines a particular directrix $F_i^d(t)$ for each developable surface segment $S_i$. This directrix is called a normal directrix. The normal directrix $F_i^d(t)$ is put on the plane vertical to the $d_i$ defining the developable surface segment $S_i$. (Referring to FIGS. 5A and 5B)

The control point $d_{i,j}^d$ of the normal directrix can be searched from the following Equation 4.

$$\begin{aligned}d_i &= p_{i,k} - p_{i-1,k}, (d_i \neq 0) \qquad \text{[Equation 4]}\\ p_{i-1,0} &= p_i^d, 0, \\ p_{i-1,j} &= p_{i,j}^d + h_{i,j}^L \cdot d_i \\ p_{i,j} &= p_{i,j}^d + h_{i,j}^U \cdot d_i \\ &= p_{i+1,j}^d + h_{i+1,j}^L \cdot d_{i+1} \end{aligned}$$

In the above Equation, the $h_{i,j}^L$ and the $h_{i,j}^U$ are scalar values. A relation of the Equation 4 is expressed in FIG. 5A and FIG. 5B.

There is the property that the control points $d_{i,j}^d$ of the normal directrix are put on the same plane. This is expressed in the following Equation 5.

$$\begin{aligned}0 &= \langle (p_{i-1,j}^d - p_{i-1,0}^d), d_i \rangle \qquad \text{[Equation 5]}\\ &= \langle (p_{i-1,j} - h_{i,j}^L \cdot d_i - p_{i-1,0}), d_i \rangle \end{aligned}$$

The above property can be used to sequentially derive as in the following Equation 6.

$$\begin{aligned}h_{i,j}^L &= \frac{\langle (p_{i-1,j} - p_{i-1,0}), d_i \rangle}{\langle d_i, d_i \rangle} \qquad \text{[Equation 6]}\\ p_{i,j}^d &= p_{i-1,j} - h_{i,j}^L \cdot d_i \\ h_{i,j}^U &= \frac{\langle (p_{i,j} - p_{i,j}^d), d_i \rangle}{\langle d_i, d_i \rangle} \end{aligned}$$

The present invention can use the Equation 6 to express the profile curve as follows.

$$\begin{aligned}F_{i-1}(t) &= \sum_{j=0}^{m} B_j^3(t) \cdot p_{i-1,j} \qquad \text{[Equation 7]}\\ &= \sum_{j=0}^{m} B_j^3(t) \cdot (p_{i,j}^d + h_{i,j}^L \cdot d_i) \end{aligned}$$

-continued $$= \sum_{j=0}^{m} B_j^3(t) \cdot p_{i,j}^d + \left(\sum_{j=0}^{m} B_j^3(t) \cdot h_{i,j}^L\right) \cdot d_i$$

$$= F_i^d(t) + H_i^L(t) \cdot d_i$$

The present invention can use the Equation 7 to express the adjacent profile curve as in the following Equation 8.

$$F_i(t) = F_i^d(t) + H_i^U(t) \cdot d_i \quad \text{[Equation 8]}$$
$$= F_{i+1}^d(t) + H_{i+1}^L(t) \cdot d_{i+1}$$

The present invention defines a development function ($F_i$: $R^3 \rightarrow R^2$) for mapping the developable surface segment $S_i$ on the plane development drawing so as to satisfy two properties as follows.

(1) When the normal directrix $F_{dddid}{}^d(t)$ is developed on the plane P, it becomes the straight line $L_i(t)$ put on an X-axis of the P.

$$\mathcal{F}_i(F_i^d(t)) = L_i(t) = (s_i(t), 0), \quad \text{[Equation 9]}$$

$$s_i(t) = \int_0^t \|F_i^d(t)\| dt. \quad \text{[Equation 10]}$$

(2) When the ruling $d_i$ is developed on the plane P, it becomes a vector put on a Y-axis of the P.

$$F_i(d_i) = y_i = (0, \|d_i\|) \quad \text{[Equation 11]}$$

If the above-defined development function $F_i$ is used to develop the profile curve $F_{i-1}(t)$ on the plane, the planar curve $D_i^L(t)$ can be obtained.

$$\mathcal{F}_i(F_{i-1}(t)) = D_i^L(t) \quad \text{[Equation 12]}$$
$$= L_i(t) + H_i^L(t) \cdot y_i$$
$$= (s_i(t), 0) + H_i^L(t) \cdot (0, \|d_i\|)$$
$$= (s_i(t), H_i^L(t) \cdot \|d_i\|)$$

Similarly with the above, if the development function $F_i$ is used to develop the profile curve $F_i(t)$ on the plane, a planar curve $D_i^U(t)$ can be obtained.

$$\mathcal{F}_i(F_i(t)) = D_i^U(t) \quad \text{[Equation 13]}$$
$$= (s_i(t), H_i^U(t) \cdot \|d_i\|),$$
$$\mathcal{F}_{i+1}(F_i(t)) = D_{i+1}^L(t)$$
$$= (s_{i+1}(t), H_{i+1}^L(t) \cdot \|d_{i+1}\|)$$

Figure 5A:
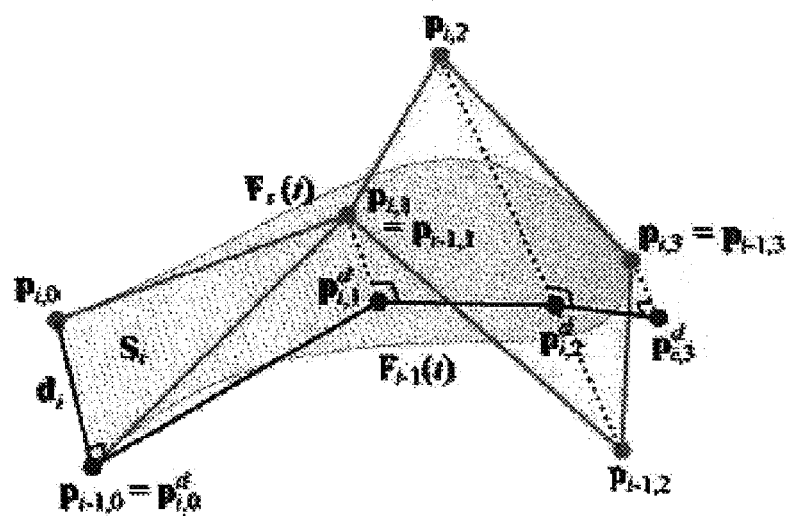
FIGS. 5a-5c are views illustrating a principle of developing a developable surface on a plane.
Figure 5B:
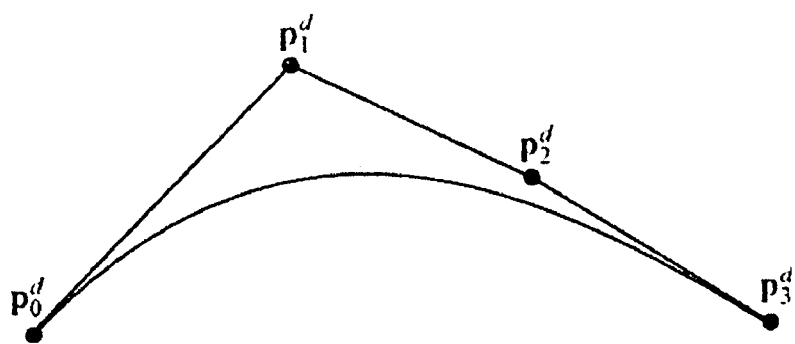
Figure 5C:
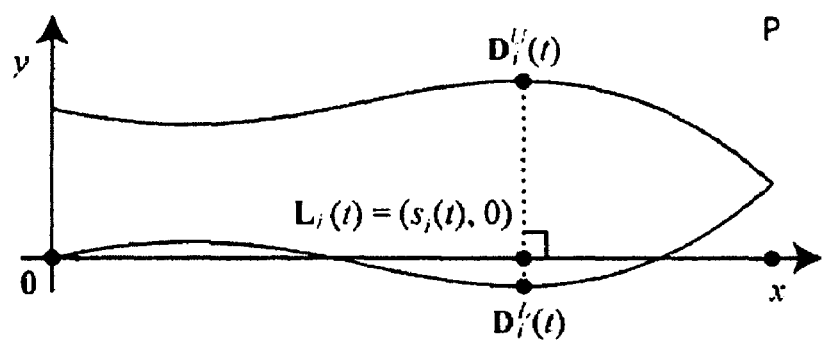

The above Equation can be used to develop the developable surface segment of FIG. 5A on the plane as in FIG. 5C.

Properties from the Equations 4 to 13 can be used to make an algorithm LIDM-GC-Plane-Dvlp for performing the step 207. This algorithm receives an output of the algorithm LIDM-GC-Dvlp and an integer for approximating the Equation 10 to approximate the planar development drawing to the polygonal for output (S208).

Figure 7A:
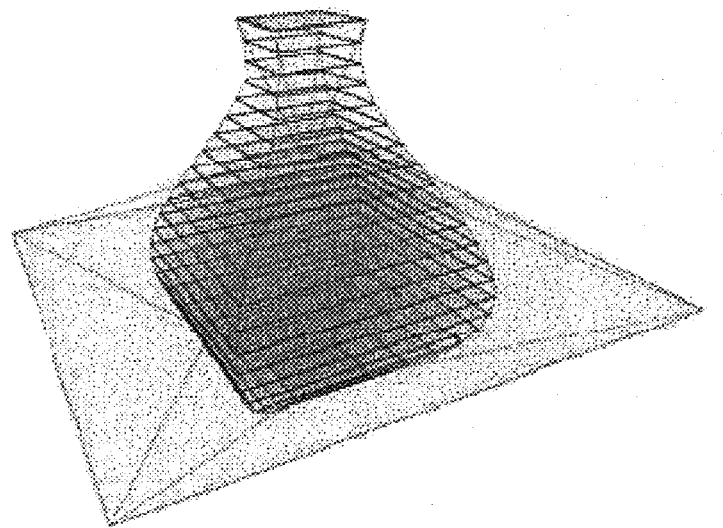
FIGS. 7a-7c are exemplary views illustrating a 3-dimensional model that is assembled using a development drawing designed through algorithms of FIGS. 3 and 6.
Figure 7B:
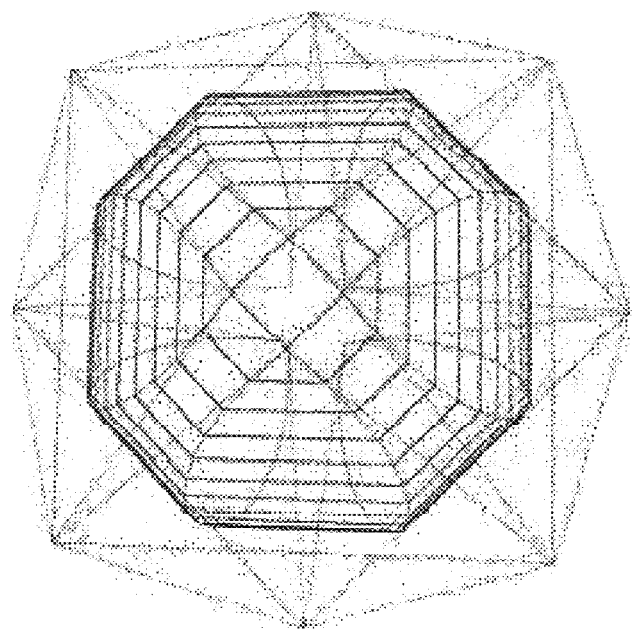
Figure 7C:
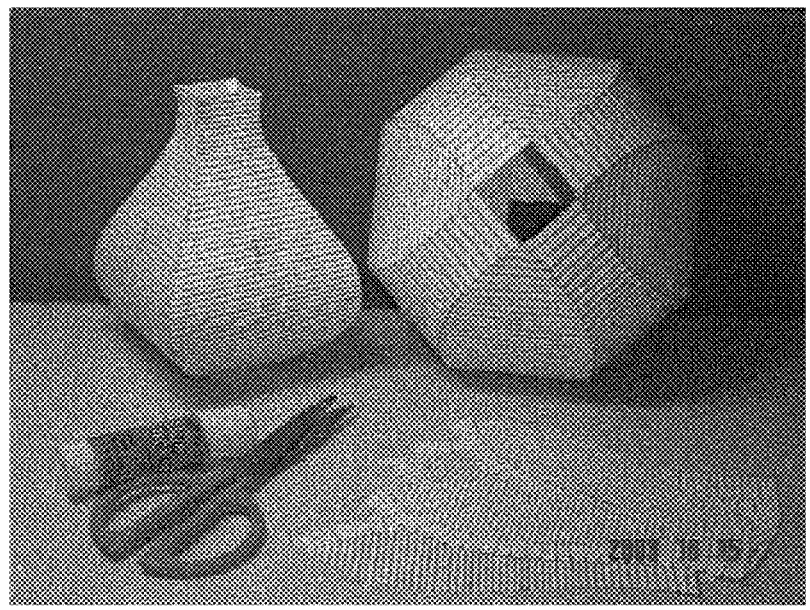

FIG. 7 shows an embodiment in which the procedure is performed along the flow chart of FIG. 2 to design the general circumference surface comprised of the developable surface segment, the development drawing is drawn on a planar object, and the planar object is cut and assembled.

FIGS. 7A and 7B show an example in which a bottle and vessel-shaped virtual cubic figure designed using the algorithm LIDM-GC-Dvlp is made into an actual cubic figure by generating the development drawing using the algorithm LIDM-GC-Plane-Dvlp, and printing the generated development drawing on a paper only with scissors and paste.

The above method can be applied to a certain thin-plate shaped material that can be approximated to the plane other than the paper.

As described above, the present invention improves the conventional method, in which the general circumference surface is generated and calculated using the direction map, in the developable surface design where the development drawing is drawn and assembled on the object that can be approximated to the plane such as a thin iron plate, the paper and the like to make the cubic figure, such that the entire surface can be effectively generated using a definition of a sequential factoring curve without generating the finite number of the middle contours, and the development drawing of the direction map based general circumference surface satisfying the particular condition can be generated on the 2-dimension.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A computer method for designing a development drawing of a developable surface, the computer method being executable within a computer and comprising:
setting a control contour from a circumference surface of a 3-dimensional model;
executing a first algorithm LIDM-GC-Dvlp within the computer to search out a control point set;
outputting a control point of a profile curve;
imaging, within the computer, a developable surface type general circumference surface;
modifying a design of the user viewable development drawing of a developable surface by using user input depending on the imaging result;
selecting a developable surface segment intended to generate the development drawing;
executing a second algorithm LIDM-GC-Plane-Dvlp within the computer for the control point to generate the development drawing; and
drawing the development drawing on an essentially planar object such that the entire surface of a cubic figure can be effectively generated using sequential factoring curves without generating a finite number of middle contours.

2. The method of claim 1, wherein in the control contour setting step of, planes having the control contours put thereon are allowed to be all parallel to one another such that a circumference typed developable surface segment can be generated.

3. The method of claim 1, wherein the algorithm LIDM-GC-Dvlp comprises the steps of:
changing a (m+1) number of inputted control contours into a direction map;
merging the changed control contours to make a new merged direction map;

searching the (m+1) number of control points for each direction vector of the merged direction map; and searching the control points by using a property of a direction map derived by the following Equation:

$$\langle F_i(u) - F_{i-1}(u), d_i \rangle = 0$$

$$\langle p_{i,j} - p_{i-1,j}, d_i \rangle = 0, \quad \text{[Equation 11]}$$

wherein $p_{i,j}$ and $p_{i-1,j}$ are control points; $F_{i-1}(u)$ and $F_i(u)$ are profile curves of a developable surface segment; u is a vertex; and $d_i$ is a direction vector.

4. The method of claim 1, wherein the control point outputted from the algorithm LIDM-GC-Dvlp is used to factor and express a profile curve as in the following Equation:

$$F_i(u) = \sum_{j=0}^{m} B_j^m(u) \cdot p_{i,j},$$

wherein $B_j^m(u)$ is a Bernstein polynomial, $P_{i,j}$ is the control point, u is a vertex, and $F_i(u)$ is a profile curve.

5. The method of claim 1, wherein the control point outputted from the algorithm LIDM-GC-Dvlp is used to factor a developable surface segment as in the following Equation:

$$S_i(u, v) = (1 - v)F_{i-1}(u) + vF_i(u)$$

$$= (1 - v)\sum_{j=0}^{m} B_j^m(u) \cdot p_{i-1,j} +$$

$$v \sum_{j=0}^{m} B_j^m(u) \cdot p_{i,j}$$

$$= \sum_{j=0}^{m} \sum_{k=0}^{1} B_j^m(u) B_k^1(u) \cdot p_{i-1+k,j},$$

wherein $S_i(u,v)$ is a developable surface; $B_j^m(u)$ and $B_k^1(u)$ are Berstein polynomials; $p_{i-1,j}$, $p_{i,j}$, and $p_{i-1+k,j}$ are control points; u and v are vertices; m is the number of contours; and $F_{i-1}(u)$, $F_i(u)$ are profile curves.

6. The method of claim 1, wherein the algorithm LIDM-GC-Plane-Dvlp comprises the steps of:

(a) defining a normal directrix and its control point to satisfy a relation of the following Equation (1):

$$d_i = p_{i,k} - p_{i-1,k}, (d_i \neq 0) \quad \text{Equation (1)}$$

$$p_{i-1,0} = p_{i,0}^d,$$

$$p_{i-1,j} = p_{i,j}^d + h_{i,j}^L \cdot d_i$$

$$p_{i,j} = p_{i,j}^d + h_{i,j}^U \cdot d_i$$

$$= p_{i+1,j}^d + h_{i+1,j}^L \cdot d_{i+1},$$

wherein $p_{i,k}$, $p_{i-1,k}$, $p_{i,0}^d$, $p_{i,j}^d$ and $p_{i+1,j}^d$ are control points; $d_i$ and $d_{i+1}$ are direction vectors; and, $h_{i+1,j}^L$, $h_{i,j}^L$ and $h_{i,j}^U$ are scalar values;

(b) calculating values necessary for expressing the normal directrix as in the following Equation (3) by using the following Equation (2):

$$0 = \langle (p_{i-1,j}^d - p_{i-1,0}^d), d_i \rangle \quad \text{Equation (2)}$$

$$= \langle (p_{i-1,j} - h_{i,j}^L \cdot d_i - p_{i-1,0}), d_i \rangle,$$

wherein $p_{i-1,j}^d$, $p_{i-1,0}^d$ are control points; $p_{i-1,j}$ and $p_{i-1,0}$ are control points; $h_{i,j}^L$ is a scalar value; and, $d_i$ is a direction vector;

$$h_{i,j}^L = \frac{\langle (p_{i-1,j} p_{i-1,0}), d_i \rangle}{\langle d_i, d_i \rangle} \quad \text{Equation (3)}$$

$$p_{i,j}^d = p_{i-1,j} - h_{i,j}^L d_i$$

$$h_{i,j}^U = \frac{\langle (p_{i,j} - p_{i,j}^d) d_i \rangle}{\langle d_i, d_i \rangle}$$

wherein $p_{i-1,j}$, $p_{i-1,0}$, $p_{i,j}$, and $p_{i,j}^d$ are control points; $d_i$ is a direction vector; and, $h_{i,j}^U$ and $h_{i,j}^L$ are scalar values;

(c) expressing adjacent profile curves by the normal directrix and the direction vector as in the following Equations 4 and 5:

$$F_{i-1}(t) = \sum_{j=0}^{m} B_j^3(t) \cdot p_{i-1,j} \quad \text{Equation (4)}$$

$$= \sum_{j=0}^{m} B_j^3(t) \cdot (p_{i,j}^d + h_{i,j}^L \cdot d_i)$$

$$= \sum_{j=0}^{m} B_j^3(t) \cdot p_{i,j}^d + \left(\sum_{j=0}^{m} B_j^3(t) \cdot h_{i,j}^L\right) \cdot d_i$$

$$= F_i^d(t) + H_i^L(t) \cdot d_i,$$

wherein $B_j^3(t)$ and $B_j^3(t)$ are Berstein polynomials; $p_{i-1,j}$, $p_{i,j}^d$ are control points; $h_{i,j}^L$ and $H_i^L(t)$ are scalar values; t is a time; $F_i^d(t)$ is a normal directrix; m is the number of contours; t is a time; and, $d_i$ is a direction vector;

$$F_i(t) = F_i^d(t) + H_i^U(t) \cdot d_i; \quad \text{Equation (5)}$$

$$= F_{i+1}^d(t) + H_{i+1}^L(t) \cdot d_{i+1},$$

wherein $F_i^d(t)$ and $F_{i+1}^d(t)$ are development functions; $H_i^U(t)$ and $H_{i+1}^L(t)$ are scalar values; t is a time; and, $d_i$ and $d_{i+1}$ are direction vectors;

(d) defining a development function satisfying the following Equations (6), (7) and (8):

$$F_i(F_i^d(t)) = L_i(t) = (s_i(t), 0), \quad \text{Equation (6)}$$

wherein $F_i$ is a development function; $F_i^d(t)$ is a normal directrix; $L_i(t)$ is a straight line; t is a time; and $s_i(t)$ is a developable surface;

$$s_i(t) = \int_0^t \|\dot{F}_i^d(t)\| dt, \quad \text{Equation (7)}$$

wherein $F_i^d(t)$ is the normal directrix, t is a time, and $s_i(t)$ is a developable surface;

$$F_i(d_i) = y_i = (0, |d_i|), \quad \text{Equation (8)}$$

wherein $F_i$ is a development function; $y_i$ is the y axis; and $d_i$ is the direction vector;

(e) approximating and developing the profile curve on the plane as in the following Equations (9) and (10):

$$\mathcal{F}_i(F_{i-1}(t)) = D_i^L(t) = L_i(t) + H_i^L(t) \cdot y_i \quad \text{Equation (9)}$$
$$= (s_i(t), 0) + H_i^L(t) \cdot (0, \|d_i\|)$$
$$= (s_i(t), H_i^L(t) \cdot \|d_i\|),$$

wherein $F_i$ is a development function; $F_{i-1}(t)$ is a normal directrix; $D_i^L(t)$ is the planar curve; $L_i(t)$ is a straight line; $H_i^L(t)$ is scalar value; $y_i$ is the y axis; $d_i$ is a direction vector; t is a time; and $s_i(t)$ is a developable surface;

$$F_i(F_i(t)) = D_i^U(t) = (s_i(t), H_i^U(t) \cdot \|d_i\|) \quad \text{Equation (10)}$$
$$F_{i+1}(F_i(t)) = D_{i+1}^L(t) = (s_{i+1}(t), H_{i+1}^L(t) \cdot \|d_{i+1}\|),$$

wherein $F_i$ and $F_{i+1}$ are development functions; $F_i(t)$ is a normal directrix; $D_i^U(t)$ and $D_{i+1}^L(t)$ are planar curves; $s_i(t)$ and $s_{i+1}(t)$ are developable surfaces; $H_i^U(t)$ and $H_{i+1}^L(t)$ are scalar values; t is a time; and, $d_i$ and $d_{i+1}$ are direction vectors.

* * * * *